US010491120B2

(12) United States Patent
Pant et al.

(10) Patent No.: US 10,491,120 B2
(45) Date of Patent: Nov. 26, 2019

(54) CONSTANT OFF-TIME CONTROL METHOD FOR BUCK CONVERTERS USING COUPLED INDUCTORS

(71) Applicant: Apple Inc., Cupertino, CA (US)

(72) Inventors: Sanjay Pant, Santa Clara, CA (US); Fabio Gozzini, San Jose, CA (US); Jay B. Fletcher, Sunnyvale, CA (US); Shawn Searles, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/180,782

(22) Filed: Nov. 5, 2018

(65) Prior Publication Data
US 2019/0140539 A1 May 9, 2019

Related U.S. Application Data

(63) Continuation of application No. 15/403,255, filed on Jan. 11, 2017, now Pat. No. 10,122,275.

(60) Provisional application No. 62/398,312, filed on Sep. 22, 2016.

(51) Int. Cl.
H02M 3/158 (2006.01)
H02M 1/08 (2006.01)
H02M 1/00 (2006.01)

(52) U.S. Cl.
CPC .............. H02M 3/158 (2013.01); H02M 1/08 (2013.01); H02M 3/1584 (2013.01); H02M 2001/0009 (2013.01); H02M 2003/1586 (2013.01)

(58) Field of Classification Search
CPC ....... H02M 3/1584; H02M 2003/1586; H02M 3/158; H02M 2001/0009
See application file for complete search history.

(56) References Cited

U.S. PATENT DOCUMENTS

| 7,233,132 | B1 * | 6/2007 | Dong | H02M 3/1584 323/272 |
| 8,179,116 | B2 | 5/2012 | Wei et al. | |
| 9,882,477 | B2 | 1/2018 | Childs | |
| 2002/0125869 | A1 * | 9/2002 | Groom | H02M 3/1584 323/283 |

(Continued)

FOREIGN PATENT DOCUMENTS

EP 1835604 9/2007

OTHER PUBLICATIONS

Wayne Rewinkel, "Save a Buck With a Coupled Inductor," EE Times; Jun. 22, 2005; downloaded from the Internet: http://www.eetimes.com/document.asp?doc_id=1273022, 5 pages.

(Continued)

Primary Examiner — Yusef A Ahmed
Assistant Examiner — Ishrat F Jamali
(74) Attorney, Agent, or Firm — Meyertons, Hood, Kivlin, Kowert & Goetzel, P.C.

(57) ABSTRACT

A system that includes a regulator unit is disclosed. The regulator unit includes first and second phase units whose outputs are coupled to through first and second coupled inductors, respectively, to a power supply node of a circuit block. The first phase unit may be configured to discharge, for a first period of time, the power supply node through the first inductor in response to determining a sense current is greater than a demand current. The operation of the second phase unit may follow that of the first phase unit after a second period of time has elapsed.

20 Claims, 7 Drawing Sheets

(56) References Cited

U.S. PATENT DOCUMENTS

| | | |
|---|---|---|
| 2003/0214354 A1 | 11/2003 | Chen et al. |
| 2005/0225307 A1* | 10/2005 | Sato .................. H02M 3/1584 |
| | | 323/282 |
| 2006/0043943 A1 | 3/2006 | Huang et al. |
| 2007/0200538 A1 | 8/2007 | Tang et al. |
| 2007/0290664 A1 | 12/2007 | Moyer et al. |
| 2009/0237049 A1* | 9/2009 | Hachiya ................ H02M 3/156 |
| | | 323/282 |
| 2010/0102791 A1 | 4/2010 | Wei et al. |
| 2010/0156361 A1 | 6/2010 | Barrenscheen |
| 2010/0320983 A1 | 12/2010 | Wu |
| 2012/0319478 A1 | 12/2012 | Gentchev et al. |
| 2013/0099840 A1* | 4/2013 | Lee ...................... H02M 3/156 |
| | | 327/175 |
| 2015/0028832 A1 | 1/2015 | Tournatory et al. |
| 2015/0207409 A1 | 7/2015 | Nakao |
| 2016/0012965 A1 | 1/2016 | Jiang et al. |
| 2016/0116549 A1 | 4/2016 | Mathew et al. |
| 2016/0268904 A1 | 9/2016 | Melendy et al. |

OTHER PUBLICATIONS

International Search Report and Written Opinion in Appl. PCT/US2017/048286 dated Nov. 23, 2017, 13 pages.

\* cited by examiner

CONSTANT OFF-TIME CONTROL METHOD FOR BUCK CONVERTERS USING COUPLED INDUCTORS

PRIORITY INFORMATION

The present application is a continuation of U.S. application Ser. No. 15/403,255, filed Jan. 11, 2017 (now U.S. Pat. No. 10,122,275) which claims priority to U.S. Provisional App. No. 62/398,312, filed Sep. 22, 2016; the disclosures of each of the above-referenced applications are incorporated by reference herein in their entireties.

BACKGROUND

Technical Field

Embodiments described herein relate to integrated circuits, and more particularly, to techniques for generating regulated power supply voltages.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc.

Such mobile devices may include multiple integrated circuits, each performing different tasks. In some cases, circuits that perform different tasks may be integrated into a single integrated forming a system on a chip (SoC). The different functional units within a SoC may operate at different power supply voltage levels. In some designs, power supply or regulator circuits may be included in, or external to, the SoC to generate different voltage levels for the myriad functional units included in the SoC.

Regulator circuits may include one or more reactive circuit components. For example, individual regulator sub-assemblies may employ a combination of inductors or capacitors. The reactive circuit components may be fabricated on an integrated circuit with the regulator circuits, or they may be included as discrete components in a semiconductor package or circuit board.

SUMMARY OF THE EMBODIMENTS

Various embodiments of a system including an integrated circuit die and decoupling unit are disclosed. Broadly speaking, a system is contemplated in which a first inductor is coupled to a power supply node of a circuit block, and a second inductor is coupled to the power supply node and is inductively coupled to the first inductor. A first phase unit may be configured to generate a demand current using a reference voltage and a voltage level of the power supply node, and to compare the demand current to a current being source to the power supply node through the first inductor. The first phase unit may be further configured to discharge, for a first time period, the power supply node through the first inductor in response to a determination that the current being sourced to the power supply node is greater than the demand current. Additionally, the first phase unit may charge the power supply node through the first inductor in response to a determination that the first time period has expired. The second phase unit may be configured to discharge, for a second time period, the power supply node through the second inductor and charge the power supply node through the second inductor in response to a determination that a third time period has expired since the first phase unit began to charge the power supply node through the first inductor.

In one embodiment, the first phase unit may include a first driver circuit coupled to the first inductor. The first phase unit may be further configured to determine a first average voltage at a first output terminal of the first driver circuit while charging the power supply node through the first inductor.

In a further embodiment, the second phase unit may include a second driver circuit coupled to the second inductor. The second phase unit may be further configured to determine a second average voltage at a second output terminal of the second driver circuit while charging of the power supply node through the second inductor.

BRIEF DESCRIPTION OF THE DRAWINGS

The following detailed description makes reference to the accompanying drawings, which are now briefly described.

Figure 1:
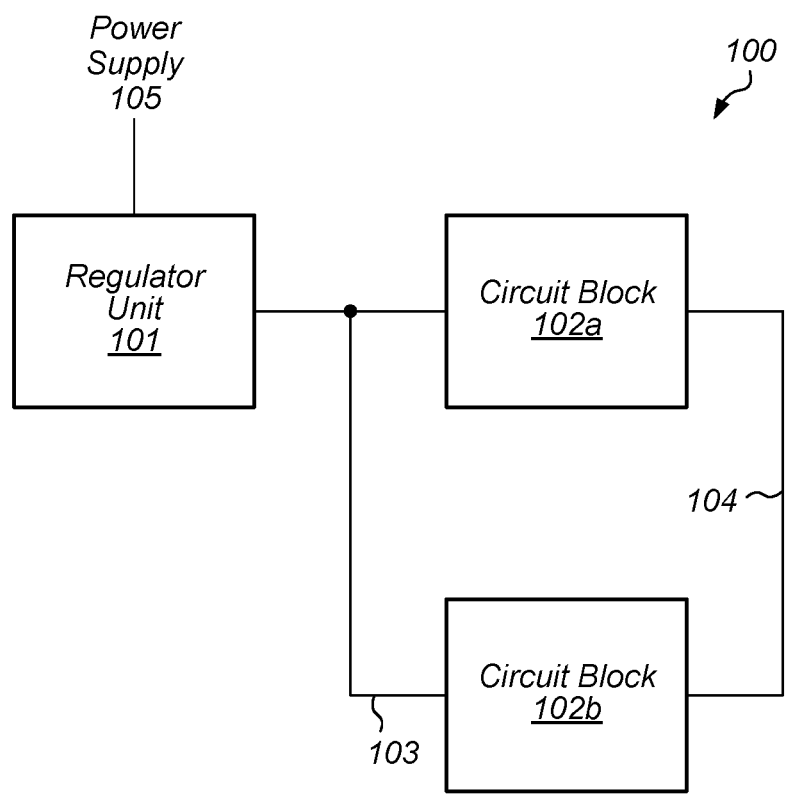
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f)

interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computing systems may include multiple functional units or circuit blocks. These circuit blocks may be mounted together in a common integrated circuit package, or circuit board. Some computing systems may include multiple circuit blocks on a single integrated circuit, commonly referred to as a "System-on-a-chip" or "SoC." Each circuit block within a computing system, may operate at a different voltage levels, which may be different than a voltage level of a master power supply of the computing system. In order to generate the desired voltage levels, one or more regulator units may be employed.

In some computing systems, DC-DC switching regulators are used to generate the desired voltage levels. Switching regulators rapidly switch a series of devices, such as, e.g., transistors, on and off in order to transfer charge to or from a load through an inductor (commonly referred to as a "charge cycle" and "discharge cycle," respectively). The load may include one or more of the aforementioned circuit blocks. By adjusting the duration of the time individual devices are switched on and off, the voltage level at the load may be kept within a predetermined range of a desired value.

To control how the devices are switched on and off in order to maintain the desired value voltage level at the load, regulators employ varying control methods. For example, in current mode control methods, slope compensation may be required to maintain stability of the current loop. The circuits associated with performing slope compensation add area, power consumption, and complexity to a regulator.

In cases were multiple coupled inductors are employed, slope compensation circuits may become even more complicated. The embodiments illustrated in the drawings and described below may provide techniques for using multiple coupled inductors with a constant off-time control mechanism in a regulator unit while limiting the impact on design complexity, area, and power consumption.

A block diagram of a computing system including multiple devices or functional units is illustrated in FIG. 1. In the illustrated embodiment, computing system 100 includes regulator unit 101, and Circuit Blocks 102*a* and 102*b*. Regulator Unit 101 is coupled to power supply 105, and regulated power supply 103. Circuit Blocks 102*a* and 102*b* are also coupled to regulated power supply 103. Additionally, Circuit Block 102*a* is coupled to Circuit Block 102*b* via communication bus 104.

As described below in more detail, Regulator Unit 101 may, in various embodiments, be configured to generate regulated power supply 103 using power supply 105. A voltage level of regulated power supply 103 may be less than, equal to, or greater than a voltage level of power supply 105 dependent upon the needs of Circuit Blocks 102*a* and 102*b*. Although only a single regulated power supply is depicted in the embodiment illustrated in FIG. 1, in other embodiments, multiple regulated power supplies may be employed. In such cases, different devices may be coupled different regulated power supplies. Alternatively, a single device may be coupled to multiple regulated power supplies.

In the illustrated embodiment, either of Circuit Blocks 102*a* or 102*b* may include a processor, processor complex, or a memory. In some embodiments, Circuit Blocks 102*a* and 102*b* may include Input/Output (I/O) circuits or analog/mixed-signal circuits. In various embodiments, computing system 100 may be configured for use in a desktop computer, server, or in a mobile or wearable computing application. It is noted that although FIG. 1 illustrates only two circuit blocks, in other embodiments, any suitable number of circuit blocks may be employed. Additional communication busses may also be employed to connect the various devices.

As used and described herein, a processor or processor complex having one or more processors or processor cores may, in various embodiments, be representative of a general-purpose processor that performs computational operations. For example, a processor may be a central processing unit (CPU) such as a microprocessor, a microcontroller, an application-specific integrated circuit (ASIC), or a field-programmable gate array (FPGA).

In the present disclosure, a memory may describe any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example.

Analog/mixed-signal circuits may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits included in one of devices 102*a* or 102*b* may include, radio frequency (RF) circuits that may be configured for operation with wireless networks.

As used herein, I/O circuits may be configured to coordinate data transfer between computing system 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits may be configured to implement a version of Universal Serial Bus (USB) protocol, IEEE 1394 (Firewire®) protocol, or an Ethernet (IEEE 802.3) networking standard such as Gigabit Ethernet or 10-Gigabit Ethernet.

In some embodiments, each of the aforementioned circuit blocks may include multiple circuits, each of which may include multiple devices, such as, e.g., metal-oxide semiconductor field-effect transistors (MOSFETs) connected via multiple wires fabricated on multiple conductive layers. The conductive layers may be interspersed with insulating layers, such as, silicon dioxide, for example. Each circuit may also contain wiring, fabricated on the conductive layers, designated for a power supply net (or node) or a ground supply net (or node).

Each of Regulator Unit 101 and Circuit Blocks 102*a* and 102*b* may, in various embodiments, be fabricated on a silicon wafer (or simply "wafer") along with numerous identical copies of Regulator Unit 101 and Circuit Blocks 102*a* and 102*b*, each of which may be referred to as a "chip" or "die." During manufacture, various manufacturing steps may be performed on each chip in parallel. Once the manufacturing process has been completed, the individual chips may be removed from the wafer by cutting or slicing through unused areas between each chip.

In other embodiments, Regulator Unit 101 may be fabricated on a separate chip than Circuit Blocks 102*a* and 102*b*. In such cases, Regulator Unit 101 and Circuit Blocks 102*a* and 102*b* may be coupled together inside a semiconductor package. Alternatively, Regulator Unit 101 and Circuit Blocks 102a and 102b may be mounted on a common circuit board or other suitable substrate. In such cases, wiring for regulated power supply 103 and communication bus 104 may include multiple metal layers fabricated into the package or circuit board.

Figure 2:
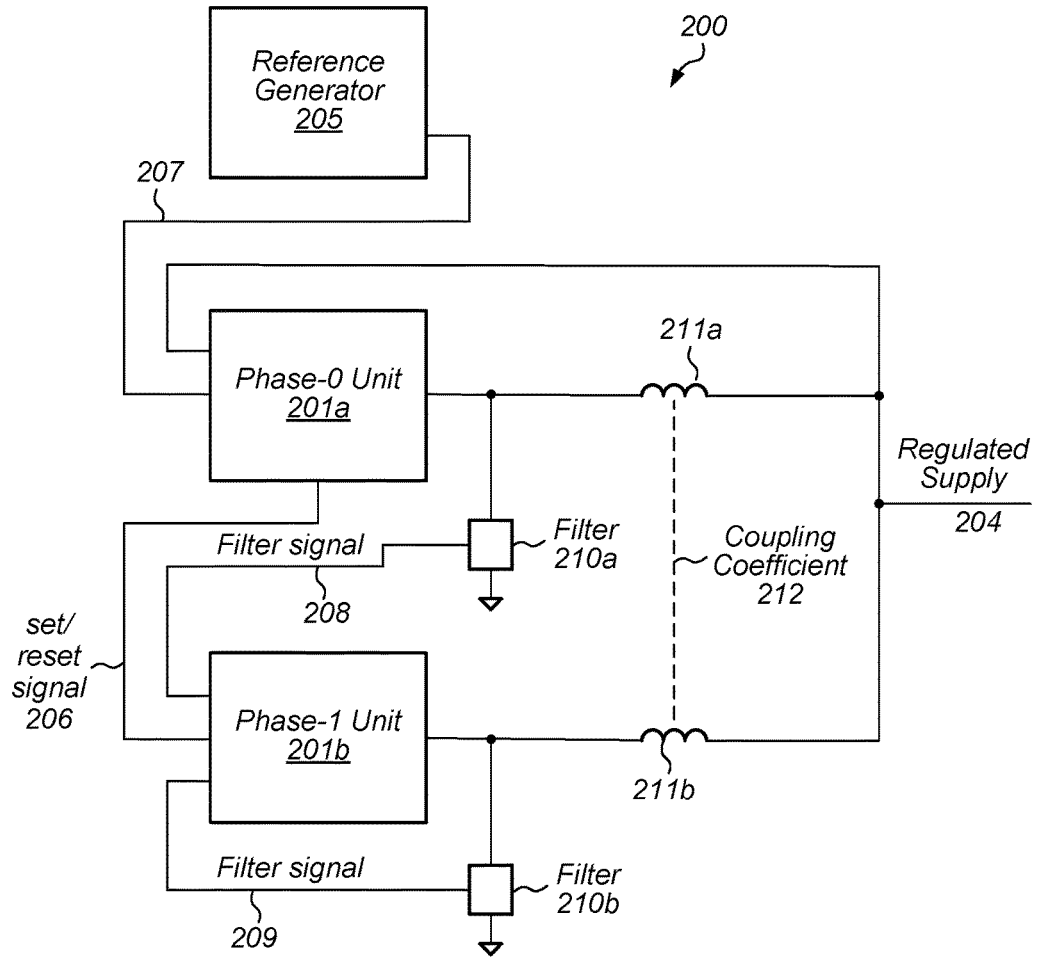
FIG. 2 illustrates an embodiment of a regulator unit.

Turning now to FIG. 2, an embodiment of a regulator unit is illustrated. Regulator unit 200 may, in various embodiments, correspond to Regulator Unit 101 as depicted in FIG. 1. In the illustrated embodiment, regulator unit 200 includes phase units 201a-b, Reference Generator 205, filters 210a-b, and inductors 211a-b.

Each of phase units 201a and 201b may be configured to charge or discharge Regulated Supply 204, by sourcing to or sinking current from Regulated Supply 204, through inductors 211a and 211b, respectively. As described below in more detail in regard to FIG. 3 and FIG. 4, each phase unit of phase units 201a-d may operate differently.

In the illustrated embodiment, Phase-0 Unit 201a may initiate a discharge cycle (also referred to as an "off cycle") in response to a determination that the current being sourced to Regulated Supply 204 is greater than current being demanded by a load circuit coupled to Regulated Supply 204. Phase-0 Unit 201a may then sink current, i.e., discharge Regulated Supply 204, through inductor 211a for a predetermined period of time. This period of time is commonly referred to as a "constant off time." Since Phase-0 Unit 201a begins to discharge Regulated Supply 204 based on current measurements, it may be referred to as a "Master Phase Unit."

Phase-1 Unit 201b, however, begins a discharge of Regulated Supply 204, by sinking current through inductor 211b, in response to the discharge by Phase-0 Unit 201a. The initiation of charging and discharging by Phase-1 Unit 201b tracks that of Phase-0 Unit 201a after a predetermined delay. Since the operation of Phase-1 Unit 201b tracks that of Phase-0 Unit 201a, Phase-1 Unit 201b may referred to as a "Slave Phase Unit."

As described below in more detail in regard to FIG. 3 and FIG. 4, each of Phase-0 Unit 201a and Phase-0 Unit 201b includes a driver circuit configured to source current to or sink current from Regulated Supply 204 through a respective one of inductors 211a and 211b. Due to on-die variations, or other manufacturing effects, the DC currents sourced by the two different phase units may be different.

To compensate for an offset between the two DC currents, the delay by which Phase-1 Unit 201b tracks Phase-0 Unit 201a may be adjusted. The adjustment is made based on a comparison of average voltages at the outputs of the two phase units. To generate the average voltages, Filters 210a and 210b are coupled to the output terminals of the driver circuits of Phase-0 Unit 201a and Phase-1 Unit 201b, respectively. As described below in regard to FIG. 5, each of Filters 210a and 210b is configured to perform a low-pass filter function in order to generate Filter signals 208 and 209, respectively. Filter signals 208 and 209 are coupled to Phase-1 Unit 201b to allow for the adjust the delay between the two phase units.

Inductor 211a is coupled between an output terminal of Phase-0 Unit 201a and Regulated Supply 204. In a similar fashion, inductor 211b is coupled between an output terminal of Phase-1 Unit 201b and Regulated Supply 204. Inductors 211a and 211b are also inductively coupled to each other. The amount of coupling is specified by Coupling coefficient 212. In various embodiments, the amount of coupled between inductors 211a and 211b may be determined based on the physical proximity between the two inductors. In some cases, additional materials may be deposited between the two inductors to enhance inductive coupling between the two inductors.

Inductors 211a and 211b may be included in an integrated circuit with the remaining circuits blocks of regulator unit 200. In other embodiments, inductors 211a and 211b may be fabricated on a separate integrated circuit die, which may then be coupled to an integrated circuit die including regulator unit 200 during a package assembly process.

Reference Generator 205 may be configured to generate a predetermined voltage level (also referred to herein as a "reference voltage level") for reference voltage 207. The reference voltage level may, in various embodiments, be adjustable upon completion of a manufacturing process. Alternatively, or additionally, the reference voltage level may be adjustable during operation by the programming of one or more registers (not shown) in response to changes in operating mode of a computing system, or in response to the execution of one or more software instructions by a processor included in the computing system.

In various embodiments, Reference Generator 205 may include a band gap reference circuit, or other suitable reference circuit, for generating a temperature and/or power supply independent reference voltage. Reference Generator 205 may also include one or more current mirrors, amplifiers, or other suitable analog circuitry necessary to adjust an initially generated voltage level to a desired level.

It is noted that the embodiment depicted in FIG. 2 is merely an example. In other embodiments, different functional units, and different arrangements of functional units are possible and contemplated.

Figure 3:
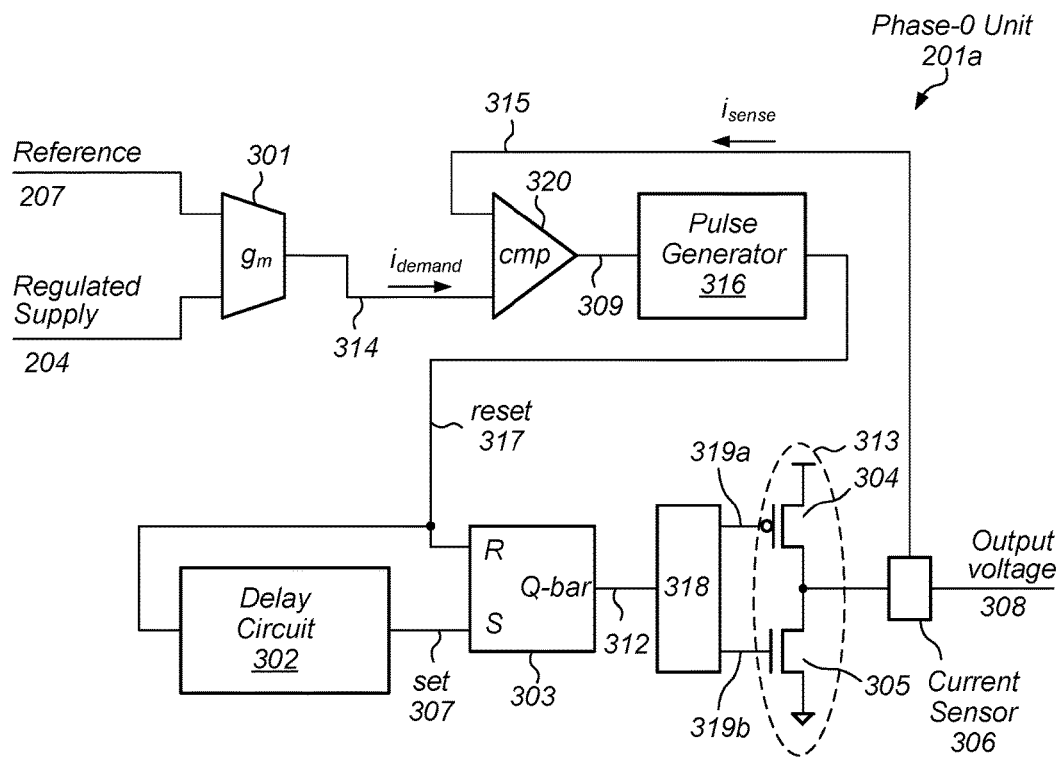
FIG. 3 illustrates an embodiment of a phase unit of a regulator unit.

An embodiment of Phase-0 Unit 201a is illustrated in FIG. 3. In the illustrated embodiment, Phase-0 Unit 201a includes transconductance amplifier 301, comparator 320, Pulse Generator 316, Delay Circuit 302, latch 303, driver circuit 313, pre-driver 318, and Current Sensor 306.

Transconductance amplifier 301 may be configured to convert a difference between reference voltage 207 and Regulated Supply 204 to $i_{demand}$ current flowing in node 314. In general, a value of $i_{demand}$ current may be proportional to a difference between reference voltage 207 and Regulated Supply 204. In some embodiments, transconductance amplifier 301 is operated without negative feedback, i.e., is may be operated "open loop."

Comparator 320 may be configured to generate an output signal on node 309 based upon a difference between $i_{demand}$ current and $i_{sense}$ current flowing in node 315. In various embodiments, a voltage level of the signal on node 309 may be proportional to the difference between the values of the two aforementioned currents. In other embodiments, comparator 320 may generate a digital signal whose logic low level corresponds to a ground potential and whose high logic high level corresponds to a voltage level sufficient to enable a n-channel metal-oxide field-effect transistor (MOSFET).

In some embodiments, Pulse generator 316 may be configured to generate a pulse on reset 317 based on the voltage level of the signal on node 309. Pulse generator may, in various embodiments, includes delay circuits, and logic gates arranged to generate pulses from either one or the other of rising or falling edges of the signal on node 309.

Latch circuit 303 may, in various embodiments, correspond to a specific embodiment of a reset-set (RS) latch, and may be designed in accordance with one of varying design styles, including, but not limited to, both static and dynamic implementations. In the illustrated embodiment, the complementary output of latch 303, denoted as Q-bar, may be set to a low logic value in response to the assertion of a particular pulse occurring on set 307. Latch 303 may be reset, i.e., output Q-bar set to a high logic level, in response to the assertion of reset 317.

Delay Circuit 302 is configured to delay reset 317 in order to generate set 307. In various embodiments, Delay Circuit 302 may include multiple delay lines through which reset 317 is routed. The selection of which delay lines are employed may be configurable during operation or during an initialization routine for Phase-0 Unit 201*a*. In other embodiments, Delay Circuit 302 may include an analog delay circuit whose delay value is determined by a voltage level of a control signal (not shown).

In some embodiments, pre-driver circuit 318 may include circuitry configured to generate control signals 319*a* and 319*b*, coupled to transistors 304 and 305, respectively. In response to changes in the logic level on node 312, pre-driver 318 may independently assert and de-assert control signals 319*a* and 319*b*. In some embodiments, an asserted one of control signals 319*a* and 318*b* may be de-asserted prior to assertion of the de-asserted control signal. By independently asserting and de-asserting control signals 319*a* and 319*b*, current flow from the power supply to ground through the driver (commonly referred to as "shoot through" current) may be reduced in various embodiments.

Driver circuit 313 may, in various embodiments, includes transistor 304 and transistor 305. In some embodiments, transistor 304 may correspond to a p-channel MOSFET, and may be configured to source current to Output 308, thereby charging Regulated Supply 204, in response to a low logic level on control signal 319*a*. Transistor 305 may, in various embodiments, correspond to an n-channel MOSFET, and may be configured to sink current from Output 308, thereby discharging Regulated Supply 204, in response to a high logic level on control signal 319*b*. It is noted that although driver circuit 313 is depicted as using MOSFETs, in other embodiments, any suitable transconductance device may be employed.

Current Sensor 306 is configured to determine a current flowing from transistor 304 into Output 308. The determined current is then sent to the input of Comparator 320 via node 315 as $i_{sense}$. In various embodiments, Current Sensor 306 may include a resistor in series with transistor 304 and Output 308. A voltage drop across the resistor may be used to generate $i_{sense}$. Current Sensor 306 may also include one or more active devices, such as, e.g., MOSFETs, to form current mirrors, or any other suitable circuits than may be employed to generate $i_{sense}$.

It is noted that the embodiment of the capacitor model illustrated in FIG. 3 is merely an example. In other embodiments, different circuit elements and different configurations of circuit elements may be employed.

Figure 4:
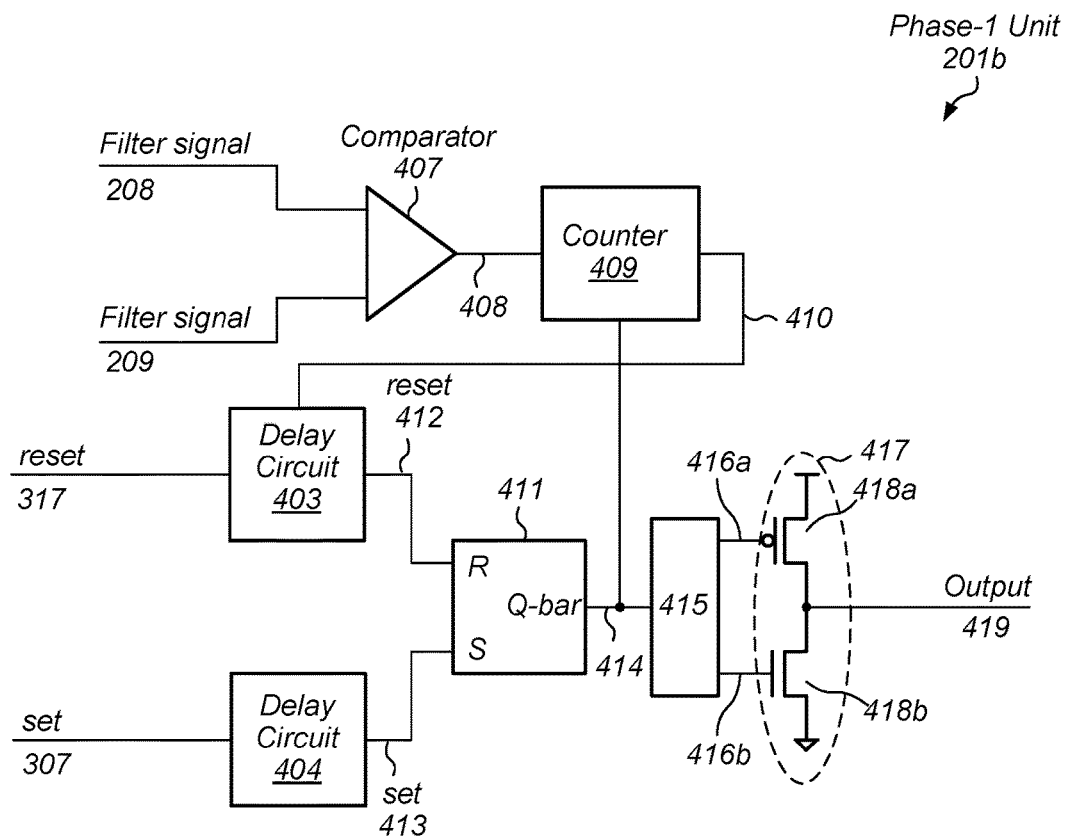
FIG. 4 illustrates another embodiment of a phase unit of a regulator unit.

Turning to FIG. 4, an embodiment of Phase-1 Unit 201*b* is depicted. In the illustrated embodiments, Phase-1 Unit 201*b* includes Comparator 407, Counter 409, Delay Circuit 403, Delay Circuit 404, latch 411, pre-driver 415, and driver 417.

Comparator 407 may be configured to compare Filter signals 208 and 209. As described below in regard to FIG. 5, Filter signals 208 and 209 are generated by filter circuits, which average the variations in the voltages output by Phase-0 Unit 201*a* and Phase-0 Unit 201*b*. Depending on which of the two filter signals is greater, Comparator 407 may assert or de-assert signal 408. In various embodiments, Comparator 407 may include a differential amplifier, or any other circuit suitable for comparing voltage levels.

Using the logical state of signal 408, Counter 409 may increment or decrement a count value. Counter 409 may be incremented or decremented when the signal on node 414 is asserted. In various embodiments, Counter 409 may include any suitable number of bits and may be reset during initialization of the Phase-1 Unit 201*b*. Although not shown, in some embodiments, a particular value may be loaded into Counter 409 following a reset.

The output of Counter 409, signal 410, is used to control the value of Delay Circuit 403. Although depicted in FIG. 4 as a single signal, in various embodiments, signal 410 may include any suitable number of data bits. Delay Circuit 403 may include multiple delay lines, or other suitable circuits that generate delay. A selection of which of the multiple delay lines reset 317 is directed may be dependent upon the value signal 410. In other embodiments, the value of signal 410 may be used as input to a digital-to-analog converter (DAC) that generates a voltage level used to control an analog delay line through which reset 317 is routed. By adjusting the delay through Delay Circuit 403, compensation for any difference between the DC currents on Phase-0 Unit 201*a* and Phase-1 Unit 201*b* may be realized.

In a similar fashion to Delay Circuit 403, Delay Circuit 404 may generate set 413, which is a delayed version of set 307 from Phase-0 Unit 201*a*. Delay Circuit 403 may include multiple delay lines, or an analog delay line. In various embodiments, an amount of delay generated by Delay Circuit 403 may be adjustable during operation.

Latch 411 is a particular embodiment of an reset-set (RS) latch that is set in response to an assertion of set 413, and reset in response to an assertion of reset 412. When latch 411 is set, the complement output of latch 411, i.e., Q-bar, is at a high logic level, and when latch 411 is reset, Q-bar is at a low logic level. Latch 411 may, in various embodiments, include any suitable combination of logic gates and/or transistors configured to implement the desired function.

Pre-driver circuit 415 may include circuitry configured to generate control signals 416*a* and 416*b*, coupled to transistors 418*a* and 418*b*, respectively. In response to changes in the logic level on node 414, pre-driver 415 may independently assert and de-assert control signals 416*a* and 416*b*. In some embodiments, an asserted one of control signals 416*a* and 416*b* may be de-asserted prior to assertion of the de-asserted control signal. By independently asserting and de-asserting control signals 416*a* and 416*b*, shoot through current from the power supply to ground through driver 417 may be reduced.

Driver circuit 417 includes transistor 418*a* and transistor 418*b*. In some embodiments, transistor 418*a* may correspond to a p-channel MOSFET, and may be configured to source current to Output 419 in response to a low logic level on control signal 416*a*. Transistor 418*b* may, in various embodiments, correspond to an n-channel MOSFET, and may be configured to sink current from Output 419 in response to a high logic level on control signal 416*b*. It is noted that although driver circuit 417 is depicted as using MOSFETs, in other embodiments, any suitable transconductance device may be employed.

It is noted that the embodiment depicted in FIG. 4 is merely an example. In other embodiments, different circuits and different arrangements of circuits may be included in Phase-1 Unit 201*b*.

Figure 5:
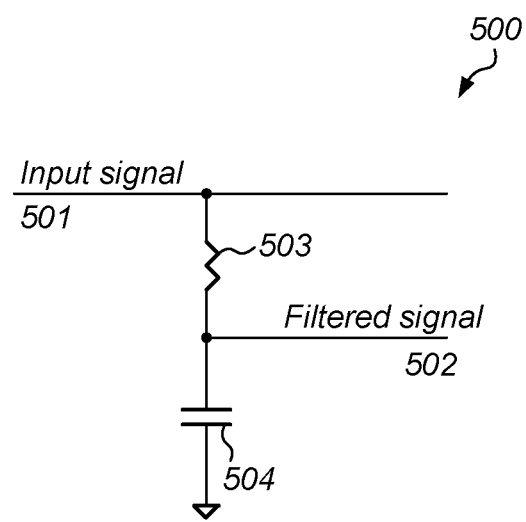
FIG. 5 depicts an embodiment of a filter circuit.

As described above, the average currents of the two phase units may be employed to compensate for any offset in the DC currents of the two phase units. To generate the average currents, a filter circuit may be used. An embodiment of such a filter circuit is illustrated in FIG. 5. In various embodiments, filter 500 may correspond to either of Filters 210*a* or 210b as depicted in FIG. 2. In the illustrated embodiment, filter 500 includes resistor 503 and capacitor 504.

Resistor 503 is coupled to Input signal 501 and Filtered signal 502. In various embodiments, Input Signal may correspond to the output signal of either Phase Unit 201a or Phase Unit 201b, and Filtered signal 502 may correspond to either of filter signals 208 or 209. Capacitor 504 is coupled to Filter signal 502 and a ground node.

Values of resistor 503 and capacitor 504 may be selected to provide a desired impedance between Input Signal 501 and the ground node at a particular frequency. The desired impedance may result in high frequency components included in Input signal 501 to be shorted to the ground node, thereby providing a low frequency components included in Input signal 501 to appear on Filtered signal 502. As described above in regard to FIG. 2 and FIG. 4, Filtered signal 502 may be used to determine any current mismatch between Phase Units 201a and 201b.

It is noted that the embodiment depicted in FIG. 5 is merely an example. Although a single resistor and capacitor as show in the embodiment depicted in FIG. 5, in other embodiments, different numbers and different arrangements of the resistors and capacitors may be employed. Additionally, or alternatively, other reactive circuit elements, such as, e.g., inductors, may be used to implement the desired filter effect.

Figure 6:
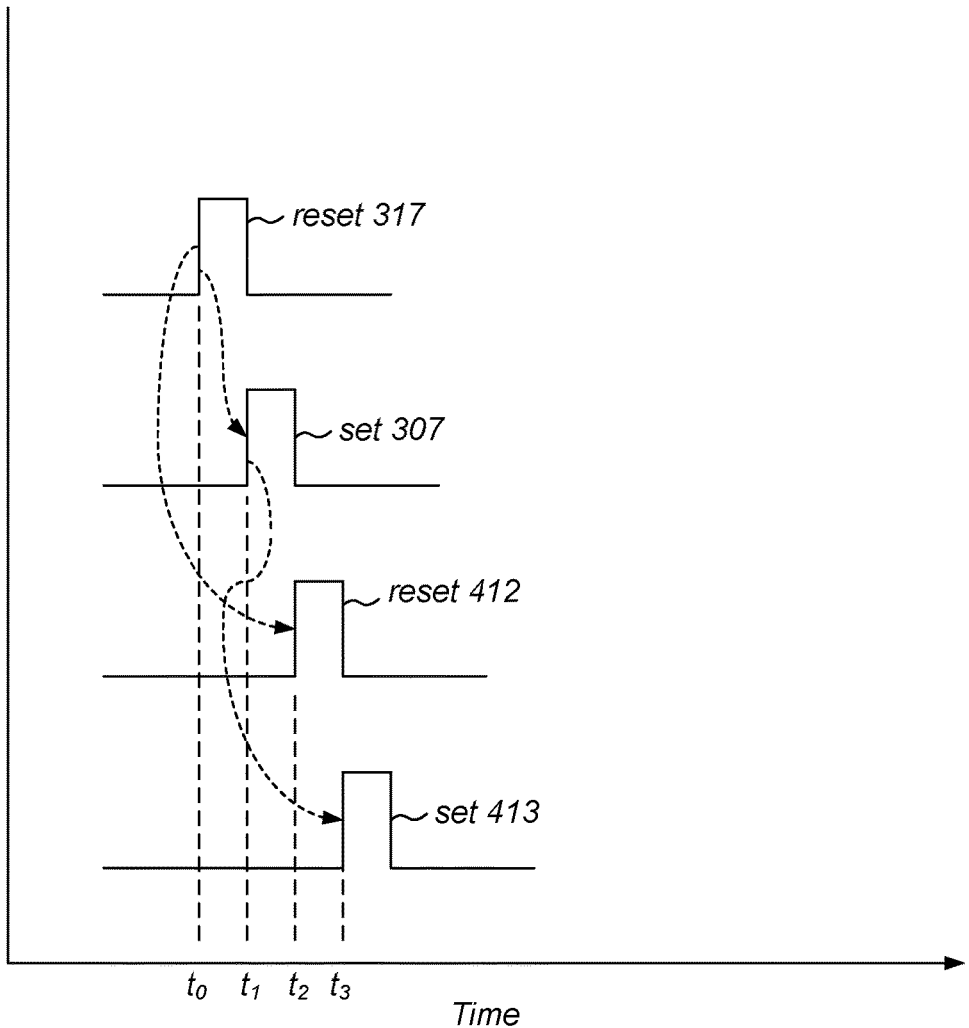
FIG. 6 depicts examples waveforms associated with operating an embodiment of a regulator unit.

As an aid in the explanation of the operation of Phase-0 Unit 201a and Phase-1 Unit 201b, example waveforms are depicted in FIG. 6. At time $t_o$, reset 317 is asserted. As described above in regard to FIG. 3, the assertion of reset 317 is the result of a determination that $i_{sense}$ is greater than $i_{demand}$. Phase-0 unit 201a will begin a discharge of Regulated Supply 204 in response to the assertion of reset 317.

The discharge Regulated Supply 204 by Phase-0 Unit 201a continues until time $t_1$, at which point set 307 is asserted, resulting in Phase-0 Unit 201a to stop discharging and begin charging Regulated Supply 204. The delay from $t_0$ to $t_1$ is determined by the value of Delay Circuit 302. In various embodiments, Delay Circuit 302 may be adjustable or programmable depending on one or more system operating parameters.

At time $t_2$, reset 412 is asserted in response to the assertion of reset 317. The delay from time $t_0$ to $t_2$ is determined by the value of Delay Circuit 403. During operation, the value of Delay Circuit 403 may be adjusted. As described above in regard to FIG. 4, a new value of Delay Circuit 403 may be based upon a comparison of the Filter signal 208 and Filter signal 209. Such an adjustment may compensate for an offset in the DC currents between Phase-0 Unit 201a and Phase-1 Unit 201b.

As with the assertion of reset 317 triggering the assertion of reset 412 at a later time, the assertion of set 307 triggers the assertion of set 413 at time t3. The difference between time $t_1$ and $t_3$ is determined by the value of Delay Circuit 404. Between time $t_2$ and $t_3$, Phase-1 Unit 201b is discharging Regulated Supply 204 through inductor 211b. Once set 412 is asserted, Phase-1 Unit 201b halts discharging and begins to charge Regulated Supply 204 by sourcing a current to the supply through inductor 211b.

It is noted that the waveforms depicted in FIG. 6 are merely examples. In other embodiments, different relative timing between the various signals may be possible.

Figure 7:
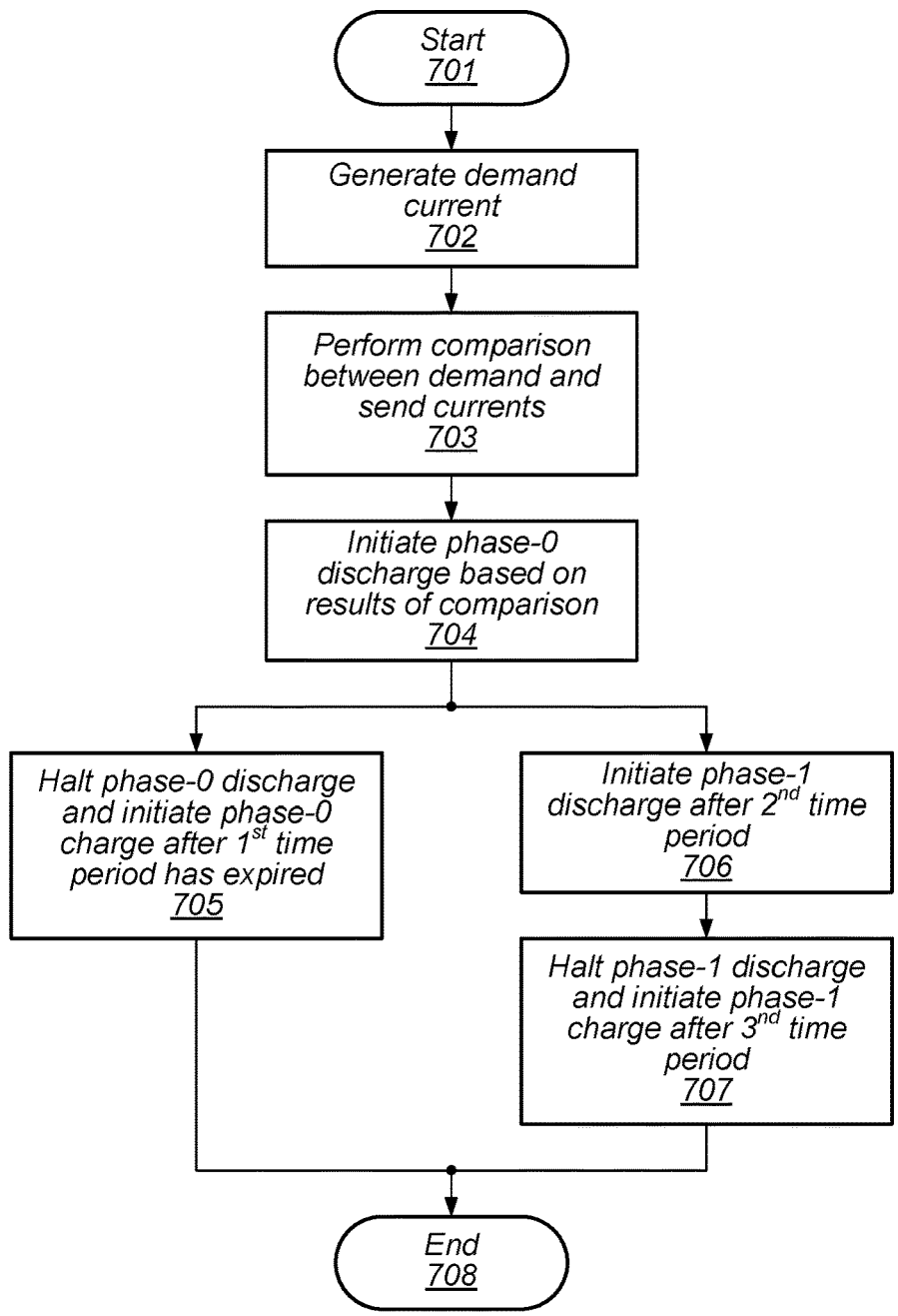
FIG. 7 depicts a flow diagram illustrating an embodiment of a method for operating a regulator unit.

Turning to FIG. 7, a flow diagram depicting an embodiment of a method for operating a regulator unit is illustrated. Referring collectively to the embodiments of FIG. 2, FIG. 3, and FIG. 4, and the flow diagram of FIG. 7, the method begins in block 701. For the purposes of explanation, it is assumed that Phase-0 Unit 201a is charging Regulated Supply 204 as the method begins.

Transconductance device 301 may generate $i_{demand}$ (block 702). As described above, to generate $i_{demand}$, transconductance device 301 may determine a different in the voltage levels of Reference 201 and Regulated Supply 204. The difference in the voltage levels may then be converted into a current.

$I_{demand}$ may then be compared to $i_{sense}$ (block 703). $I_{sense}$ may be determined using Current sensor 306. In various embodiments, Current sensor 306 may include a small value resistor, whose voltage drop is measured in order to determined $i_{sense}$. Current sensor 306 may, in other embodiments, include any suitable circuit capable of measuring a current moving in Output voltage 308.

Based on a result of the comparison between $i_{demand}$ and $i_{sense}$, Phase-0 Unit 201a may initiate a discharge cycle (block 704). In various embodiments, when $i_{sense}$ is greater than $i_{demand}$, Pulse Generator 316 may create a pulse on reset 317, which, in turn, resets latch 303. Once latch 303 is reset, signal 312 may transition to a high logic level, activating device 305 discharging Output 308. The reduction in the voltage level of Output 308 resulting from the activation of device 305 causes a discharge of Regulated Supply 204 through inductor 211a.

After a first time period has elapsed, the discharge cycle being performed by Phase-0 Unit 201a may be halted (block 705). The pulse on reset 317 may be delayed by Delay circuit 302 to generate a pulse on set 307. An amount of delay provided by Delay circuit 302 may be selected such that once pulse on reset 317 has completed, the pulse on set 307 begins. In response to the pulse on set 307, latch 303 may be set, resulting in a low logic level on node 312. Pre-driver circuit 318 may transition nodes 319a-b to low logic levels, deactivating device 305 and activating device 304. Current may then flow from the power supply through device 304 to output 308, through inductor 211a, resuming the charging of Regulated Supply 204. Once charging of Regulated Supply 204 has resumed, the method may conclude in block 708.

In parallel to the operations performed in association with block 705, Phase-1 Unit 201b may initiate a discharge of Regulated Supply 204 through inductor 211b after a second time period has elapsed since the initiation of the phase-0 discharge (block 706). The pulse on reset 317 may be delayed by Delay Circuit 403 to generate a delayed pulse on reset 412. As described above, the second time period is determined by the amount of delay provided by Delay Circuit 403, which may be adjusted based on a comparison between filter signal 208 and filter signal 209. In response to the delayed pulse on reset 412, latch 411 resets causing node 414 to be set to a high logic level. In response to the transition on node 414, Pre-driver 415 may transition signals 416a and 416b to high logic levels deactivating device 418a and activating device 418b. The activation of device 418b sinks current from Output 419 to ground, which, in turn, discharges Regulated Supply 204 through inductor 211b.

After a third time period has elapsed, Phase-1 Unit 201b may halt the discharge of Regulated Supply 204 through inductor 211b and begin to charge Regulated Supply 204 through inductor 211b (block 707). Set 307 may be delayed by Delay Circuit 404 to generate set 413. When set 413 is asserted, latch 411 may be set, resulting in a transition on node 414 to a low logic level. In response to the transition of node 414 to a low logic level, pre-driver 415 may transition signals 416a and 416b to low logic levels, deactivating device 418b and activating device 418a. The activation of device 418a sources a current to Output 419, which, in turn, charges Regulated Supply 204 through inductor 211b. With the charging of Regulated Supply 204, the method concludes in block 708.

It is noted that the embodiment of the method depicted in the flow diagram of FIG. 7 is merely an example. In other embodiments, different operations, and different orders or operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a driver circuit configured to charge, based on a set signal, an output node coupled to a supply signal via a particular inductor of a plurality of inductors;
   a comparator circuit configured to perform a comparison of a filtered voltage level of the output node and a filtered voltage level of an output of a different driver circuit;
   a counter circuit configured to increment using results of the comparison; and
   a delay circuit configured to delay a reset signal based on results of the comparison to generate a delayed reset signal, wherein an amount of delay between the reset signal and the delayed reset signal is based on a value of the counter circuit; and
   wherein the driver circuit is further configured to discharge the output node using the delayed reset signal.

2. The apparatus of claim 1, further comprising a different delay circuit configured to delay the set signal to generate a delayed set signal.

3. The apparatus of claim 2, further comprising a latch circuit configured to generate, based on values of the delayed reset signal and the delayed set signal, a logic level on a control node.

4. The apparatus of claim 3, further comprising a pre-driver circuit configured to generate a plurality of control signals coupled to the driver circuit, wherein respective values of the plurality of control signals are based on the logic level on the control node.

5. The apparatus of claim 1, further comprising a first filter circuit that includes a first resistor and a first capacitor, wherein the first filter circuit is configured to filter the voltage level of the output node to generate the filtered voltage level of the output node.

6. The apparatus of claim 5, further comprising a second filter circuit that includes a second resistor and a second capacitor, wherein the second filter circuit is configured to filter the voltage level of the output of the different driver circuit to generate the filtered voltage level of the output of the different driver circuit.

7. A method, comprising:
   generating a regulated voltage level on a supply signal using two phase units coupled to the supply signal via respective inductors of a pair of mutually coupled inductors;
   adjusting respective output voltage levels of two phase units based on an offset between respective output currents of the two phase units;
   comparing adjusted respective output voltage levels of the two phase units;
   incrementing, by a counter circuit, a count value using results of comparing the adjusted respective output voltage level of the two phase units;
   delaying a reset signal to generate a delayed reset signal using the count value; and
   discharging the supply signal by at least one of the phase unit based using the delayed reset signal.

8. The method of claim 7, wherein adjusting the respective output voltage levels includes filtering each of the respective output voltage levels of the two phase units.

9. The method of claim 8, wherein filtering each of the respective output voltage levels includes coupling outputs of the two phase units to respective capacitors using respective resistors.

10. The method of claim 8, wherein filtering each of the respective output voltage levels includes shorting frequency components of the respective output voltage levels above a threshold frequency to a ground supply node.

11. The method of claim 7, further comprising resetting a latch circuit using the delayed reset signal.

12. The method of claim 11, further comprising discharging the supply signal, by at least one of phase unit of the two phase units, based on output of the latch circuit.

13. The method of claim 11, further comprising, setting the latch circuit after a particular time period has elapsed since the latch circuit was reset.

14. An apparatus, comprising:
   a reference voltage generator circuit configured to generate a reference voltage level on a reference signal; and
   a plurality of phase units coupled to a supply signal via respective inductors of a plurality of mutually coupled inductors;
   a plurality of filter circuits, wherein each filter circuit is configured to generate a respective filtered output signal of a plurality of filtered output signals, wherein a particular filtered output signal is based on an output signal of a corresponding phase unit of the plurality of phase units; and
   wherein a first phase unit of the plurality of phase units includes a counter circuit configured to increment a count value using results of comparing a first filtered output signal of the plurality of filtered output signals and a second filtered output signal of the plurality of filtered output signals; and
   wherein a first phase unit of the plurality of phase units is configured to determine a time to sink a current from the supply signal via a corresponding inductor of the plurality of mutually coupled inductors using the count value.

15. The apparatus of claim 14, wherein a particular filter circuit of the plurality of filter circuits includes at least a resistor and a capacitor coupled in series.

16. The apparatus of claim 14, wherein to determine the time to sink the current, the first phase unit of the plurality of phase units is further configured to generate a delayed reset signal using a reset signal.

17. The apparatus of claim 16, wherein the first phase unit further includes a latch circuit configured to generate, based on value of the delayed reset signal, a logic level on a control node.

18. The apparatus of claim 14, wherein the first phase unit is further configured to source, in response to an assertion of a set signal, another current to the supply signal.

19. The apparatus of claim 14, wherein a second phase unit of the plurality of phase units is configured to source, based on a comparison of a voltage level of the supply signal and the reference voltage level, a different current to the supply signal.

20. The apparatus of claim 14, wherein the counter circuit is further configured to reset during an initialization of the first phase unit.

\* \* \* \* \*